Patented Sept. 3, 1929.

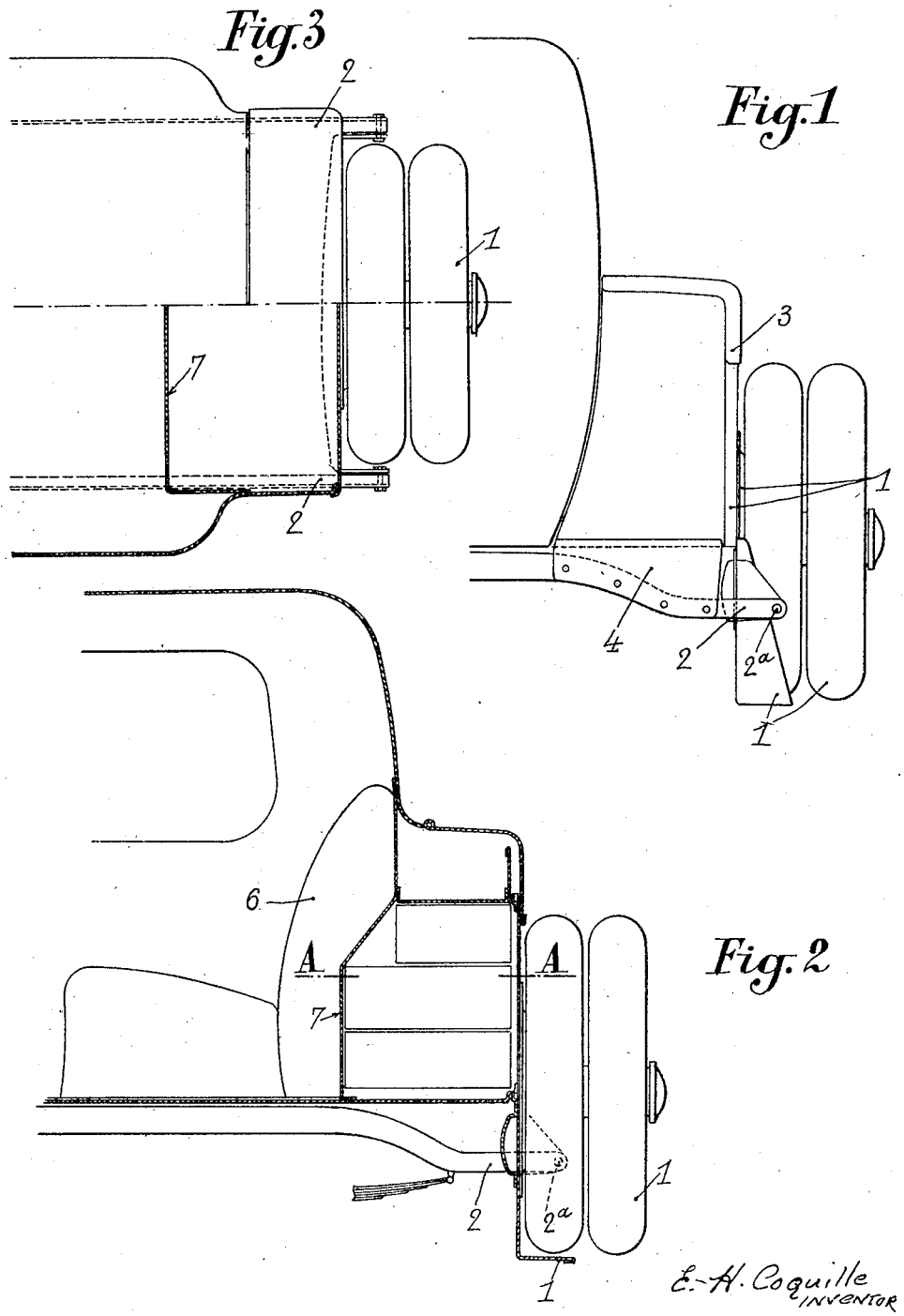

1,727,273

UNITED STATES PATENT OFFICE.

EMILE HENRI COQUILLE, OF PARIS, FRANCE.

REAR-BOX DEVICE FOR MOTOR VEHICLES.

Application filed April 9, 1928, Serial No. 268,634, and in France December 6, 1927.

The present invention relates to improvements in rear box devices for motor vehicles, which are adapted to contain or support various cases or valises, or the like, and also to contain or support numerous accessories such as a tool-chest, extra vehicle wheels, official plate, signal devices and the like.

The several features of the invention will be specified in the following description with reference to the appended drawings which are given by way of example, and in which:

Fig. 1 is a side view of a box according to the invention.

Fig. 2 is a diagrammatic sectional view of a modified construction of the box.

Fig. 3 is a top view, partly in section on the line A—A of Fig. 2, corresponding to Fig. 2.

As shown in Fig. 1, the rear box 3 comprises a main body and opening panel to which are secured the support carrying the extra vehicle wheels and the mud-guard for the extra vehicle wheels. The said rear panel and the elements which it carries, constitute a pivoting arrangement 1 which is pivoted to an axle 2ª directly carried by the longitudinal beams 2 of the vehicle frame. The said longitudinal beams 2 are extended for this purpose at the rear of the vehicle. The box 3 is connected with the longitudinal beams 2 by two sheet metal plates or cheeks 4 which may be separately secured or may consist of the extended sides of the box.

Figs. 2 and 3 represent a modified construction of the said box in which the said box is integral with the vehicle body itself. In this case, the side plates or cheeks 4 are omitted, but the pivot axle of the pivoting arrangement of the box is carried by the longitudinal beam of the vehicle frame. In this form of construction, the back of the rear seat 6 can be recessed in such manner that the width of the said box may be increased, and in this event the inner side of the box will consist of a sheet metal plate 7 secured to the vehicle body.

Obviously, the invention is not limited to the forms of construction herein described and represented, which are given solely by way of example.

Having now described my invention, what I claim as new and desire to secure by Letters Patent is:

In a rear box for motor vehicles, a rear wall for said box, a support attached to said rear wall and adapted to carry extra vehicle wheels, longitudinal beams of said vehicle adapted to support the box and an axle connected to said longitudinal beams and on which said rear wall is adapted to be pivoted.

In testimony whereof I have signed my name to this specification.

EMILE HENRI COQUILLE.